Nov. 18, 1924.　　　　　　　　　　　　　　1,515,985
T. E. WRIGHT
CENTRIFUGAL BRAKE OR SPEED CONTROL
Filed Dec. 26, 1923
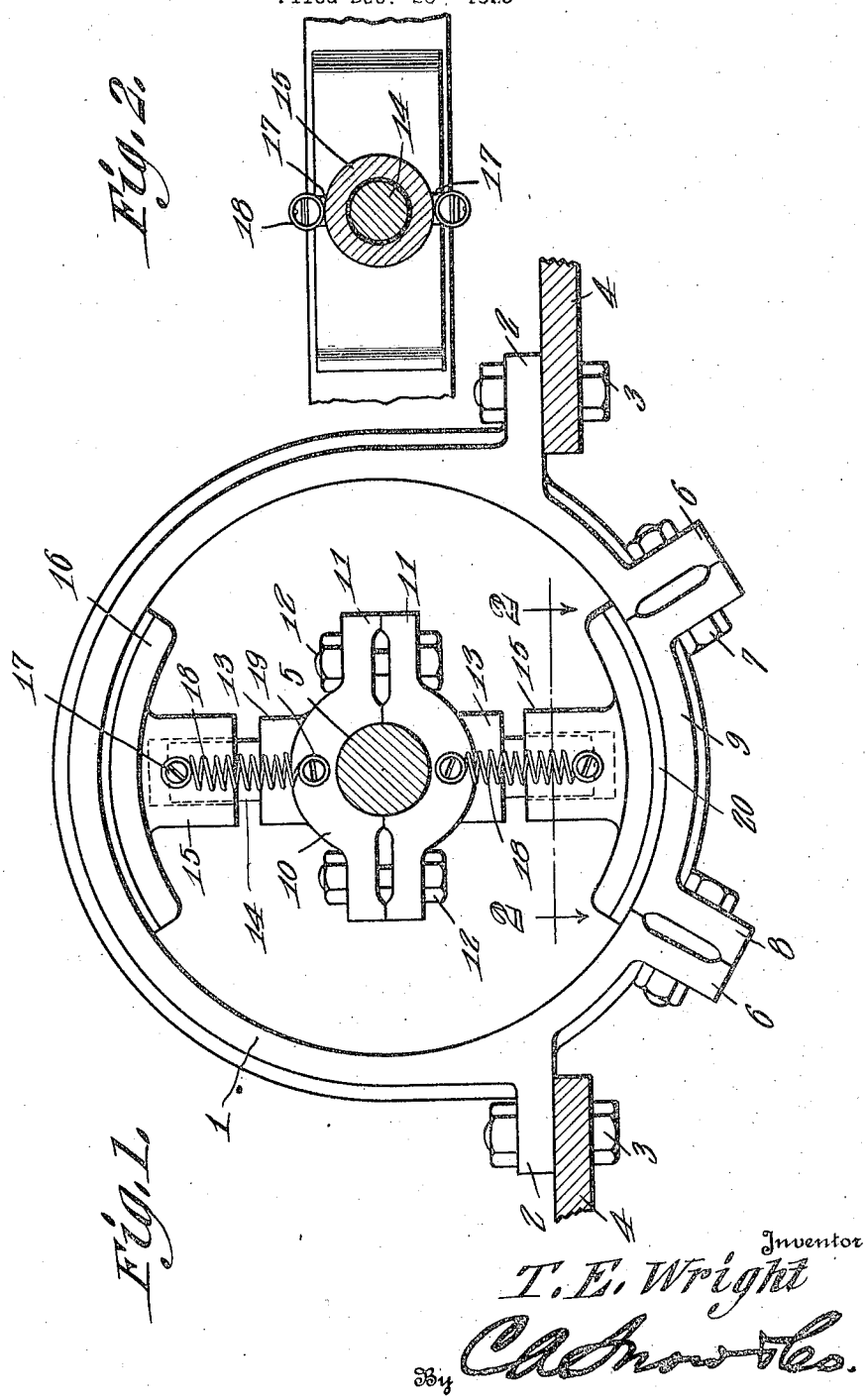

Patented Nov. 18, 1924.

1,515,985

UNITED STATES PATENT OFFICE.

THOMAS EUGENE WRIGHT, OF JERSEY CITY, NEW JERSEY.

CENTRIFUGAL BRAKE OR SPEED CONTROL.

Application filed December 26, 1923. Serial No. 682,740.

*To all whom it may concern:*

Be it known that I, THOMAS EUGENE WRIGHT, a citizen of the United States, residing at Jersey City, in the county of Hudson and State of New Jersey, have invented a new and useful Centrifugal Brake or Speed Control, of which the following is a specification.

This invention relates to centrifugal brakes and while it is useful as a means for retarding the rotation of any driven structure, it is primarily designed as a means for retarding the operation of the hoisting mechanism of a vehicle dump body during the descent of the body from its elevated to its lower or normal position.

One of the objects of the invention is to provide a simple and compact brake of this character which will operate efficiently and can be installed readily for use in connection with a rotatable shaft.

With the foregoing and other objects in view which will appear as the description proceeds, the invention resides in the combination and arrangement of parts and in the details of construction hereinafter described and claimed, it being understood that changes in the precise embodiment of the invention herein disclosed may be made without departing from the spirit of the invention.

In the accompanying drawings the preferred form of the invention has been shown.

In said drawings

Figure 1 is a side elevation of the brake, parts to which it is applied being shown in section.

Fig. 2 is a section on line 2—2, Fig. 1.

Referring to the figures by characters of reference, 1 designates an arcuate stationary brake section having oppositely extending ears 2 whereby the same may be fastened by means of bolts 3 or the like to the chassis of a vehicle or to any other suitable supporting structure indicated at 4. The ends of this section 1 are spaced apart a sufficient distance to permit the section to be placed astride a shaft 5 without removing the shaft from its bearings. Terminal ears 6 radiate from the ends of the section 1 and are adapted to be fastened by bolts 7 or the like to terminal ears 8 radiating from the ends of a removable arcuate brake section 9, this section 9 as well as the section 1 having their surfaces matching so as to provide a circular bearing face concentric with the shaft 5.

Clamped upon the shaft 5 so as to rotate therewith are opposed collar sections 10 having ears 11 projecting from the ends thereof, the ears of the opposed sections being detachably connected by bolts 12 or the like. Each of these collar sections has a central boss 13 from which radiates a guide arm 14. Slidably mounted on each guide arm is a sleeve 15 preferably formed integral with and extending inwardly from an arcuate brake shoe 16. Oppositely extending studs 17 are formed on the sleeve 15 and are connected by coiled springs 18 to similar studs 19 on the studs of the collar sections 10. Obviously these springs serve normally to draw the sleeves 15 toward the bosses 13 and, consequently, the shoes are held normally out of contact with the stationary brake member. The outer or active faces of the shoes are preferably formed with linings 20 of any suitable wear resisting material for setting up proper frictional engagement with the stationary brake member.

When shaft 5 is rotated at less than a predetermined speed, the springs 18 will be of sufficient strength to hold the brake shoes out of contact with the stationary brake member. When, however, the shaft 5 rotates at more than a predetermined speed centrifugal force will overcome the tension of the springs 18 with the result that the brake shoe will be forced outwardly so that their linings 20 will slide upon the stationary brake member and thus retard the rotation of the shaft.

Importance is attached to the fact that this brake can be applied readily to shafts and the like without the necessity of removing the shafts from their bearings.

What is claimed is:—

1. The combination with a stationary brake member including detachably connected arcuate sections cooperating to provide a circular inner surface, of a sectional shaft gripping collar, arms radiating from the sections of the collar, brake shoes slidably connected to the arms and movable by centrifugal force into engagement with the stationary brake member, and yielding connections between the brake shoes and the collar sections for holding the shoes normally disengaged from the stationary brake member.

2. The combination with a stationary brake member including detachably connected arcuate sections cooperating to provide a circular inner surface, and means extending from one of said sections for fastening the stationary brake member to the support, of opposed collar sections, means for clamping them upon a shaft concentric with said circular face, arms radiating from the collar sections, brake shoes, means extending from the shoes for slidably engaging the arms, and yielding connections between the sleeves and the collar sections for holding the shoes normally disengaged from the stationary brake member.

In testimony that I claim the foregoing as my own, I have hereto affixed my signature in the presence of two witnesses.

THOMAS EUGENE WRIGHT.

Witnesses:
L. JEREMIAH CAHICHIO,
WARDALE C. BOWEN.